(12) United States Patent
Smith et al.

(10) Patent No.: US 8,138,941 B2
(45) Date of Patent: Mar. 20, 2012

(54) LED WARNING LIGHT

(75) Inventors: Kevin M. Smith, Chester, CT (US);
Todd J. Smith, Deep River, CT (US)

(73) Assignee: Whelen Engineering Company, Inc., Chester, CT (US)

( * ) Notice: Subject to any disclaimer, the term of this patent is extended or adjusted under 35 U.S.C. 154(b) by 833 days.

(21) Appl. No.: 12/228,735

(22) Filed: Aug. 15, 2008

(65) Prior Publication Data

US 2009/0045933 A1 Feb. 19, 2009

Related U.S. Application Data

(60) Provisional application No. 60/965,169, filed on Aug. 17, 2007.

(51) Int. Cl.
*G08B 5/22* (2006.01)
*G08B 5/36* (2006.01)
*B60Q 1/00* (2006.01)

(52) U.S. Cl. .......... 340/815.45; 340/815.43; 340/815.5; 340/815.54; 340/815.57; 340/815.65; 340/815.81; 340/815.82; 340/425.5; 340/468; 340/472; 340/473; 362/800

(58) Field of Classification Search .................. None
See application file for complete search history.

(56) References Cited

U.S. PATENT DOCUMENTS

| | | | | |
|---|---|---|---|---|
| 4,778,987 A | * | 10/1988 | Saaski et al. | 250/226 |
| 6,017,049 A | * | 1/2000 | Spector | 280/288.4 |
| 6,886,963 B2 | * | 5/2005 | Lodhie | 362/235 |
| 2005/0237219 A1 | * | 10/2005 | Pederson | 340/815.45 |
| 2005/0259434 A1 | * | 11/2005 | Pederson | 362/555 |
| 2005/0264428 A1 | * | 12/2005 | Pederson | 340/815.45 |
| 2006/0012486 A1 | * | 1/2006 | Gibson et al. | 340/815.45 |
| 2007/0195527 A1 | * | 8/2007 | Russell | 362/240 |
| 2008/0136661 A1 | * | 6/2008 | Pederson et al. | 340/815.45 |

* cited by examiner

*Primary Examiner* — Julie Lieu
(74) *Attorney, Agent, or Firm* — Alix, Yale & Ristas, LLP

(57) ABSTRACT

A compact warning light employs LED lamps as a light source and has a lighthead configured for insertion into the reflector shells of a motor vehicle such as a sedan or SUV. The lighthead has a base and cover which define a sealed interior space surrounding the LED lamps. The base is constructed of heat conducting material and the LED lamps are secured to the base so that heat generated by the lamps is conducted away and dissipated by the base. The base may include a post for supporting a plurality of individually energized arrays of LED lamps. The cover may be optically clear, tinted or provided with facets or a surface texture.

7 Claims, 7 Drawing Sheets

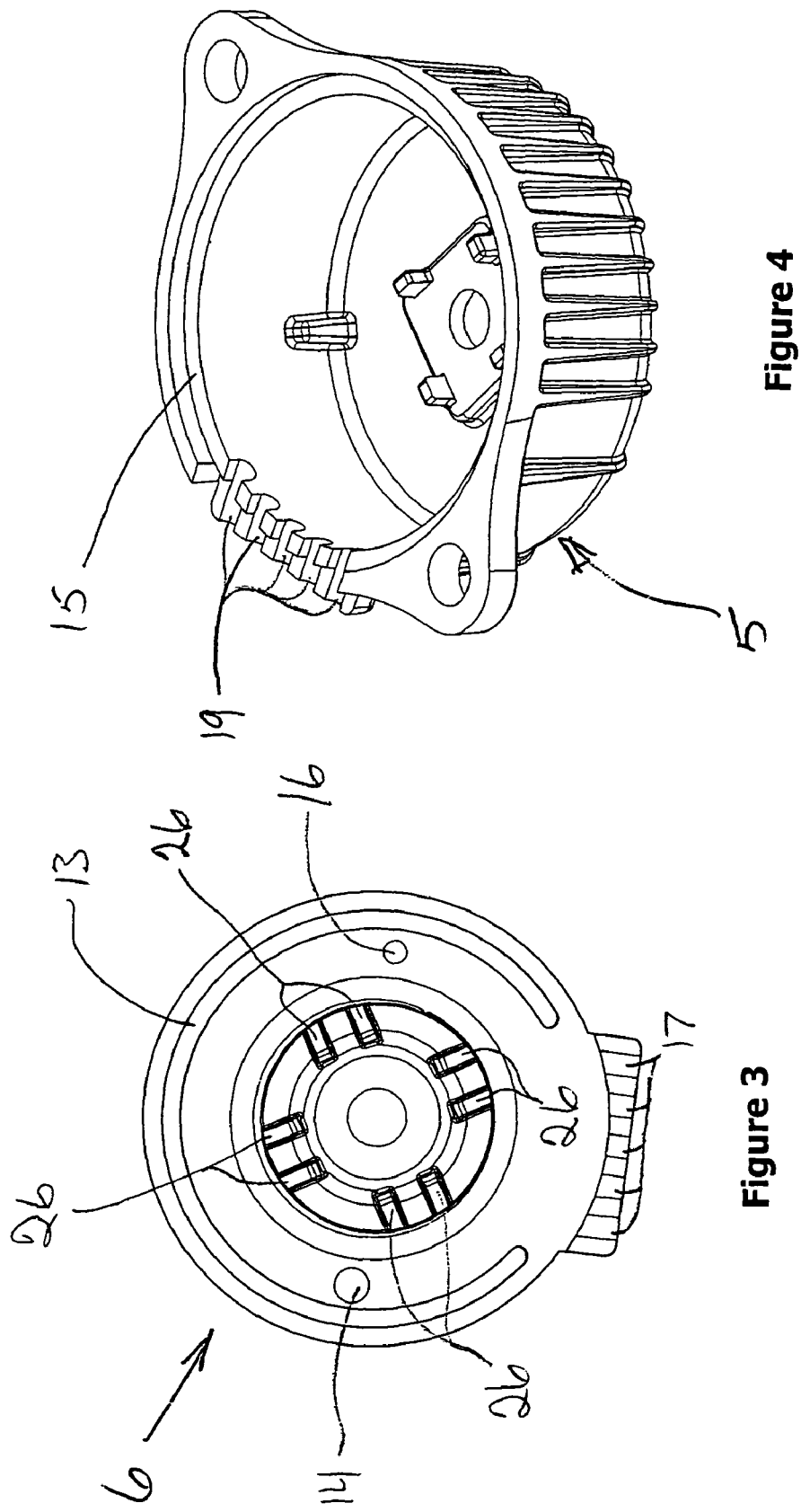

LED WARNING LIGHT

REFERENCE TO RELATED APPLICATIONS

This application claims the benefit of U.S. Provisional Application No. 60/965,169 filed Aug. 17, 2007.

TECHNICAL FIELD

The disclosure relates to a warning light and, more particularly, to a warning light utilizing light emitting diodes (LED) to generate warning light signals for use in conjunction with emergency vehicles.

BACKGROUND

Emergency vehicles are commonly provided with warning lights mounted to the exterior of the vehicle in the form of beacons and light bars. It is also known to provide emergency vehicles with warning lights mounted inside the vehicle to project warning light signals through the windshield or rear window. Further, warning lights have been mounted in the original equipment reflector shells for the front corner, taillight and reverse lights. The standard practice is to drill a hole in the enclosure and mount a halogen bulb or strobe tube in the enclosure. When power is applied to these warning lights, light fills the vehicle reflector and generates warning light signals.

Advances in LED brightness allow LEDs to replace halogen bulbs and gaseous discharge strobe tubes to generate warning light signals.

SUMMARY

The disclosed LED warning lights include a compact lighthead configured for mounting in the original equipment reflector shell of a motor vehicle. Each lighthead includes a base and cover which define an interior space sealed against the elements. The base is constructed of thermally conductive material and includes at least one planar surface to which LED lamps are mounted. The cover is constructed of light transmissive plastic material and configured to mate with complementary structures on the base. The cover is configured to fit through an opening in the reflector shell such that light generated by the LED lamps is emitted into the reflector shell and directed outwardly through the lens of the motor vehicle light.

Subsets of the LED lamps are electrically connected in series to form a plurality of LED arrays. Each LED array is provided with its own constant current source. A controller applies timed pulses of electrical current to the arrays to produce warning light signals. The controller is responsive to a pattern select input to select the generated warning light signal from a plurality of patterns stored in memory. A synchronization input to the controller allows the signals generated by multiple lightheads to be coordinated.

In one embodiment, each array of LED lamps is arranged on a planar PC board mounted to one side of a shaft in the form of a regular polyhedron. The arrays of LED lamps may be of the same or different colors and may be activated simultaneously or in groups to produce light signals of different colors. An alternative embodiment includes a surface texture on the portion of the cover through which light generated by the LED lamps will pass. The surface texture blends and diffuses light from the LED lamps to illuminate the cover and obscure the internal features of the lighthead during operation.

BRIEF DESCRIPTION OF THE DRAWINGS

FIG. 3 is a bottom plan view of the cover of FIG. 2;

FIG. 4 is a top perspective view of the base shown in FIG. 1;

DETAILED DESCRIPTION

Figure 2:
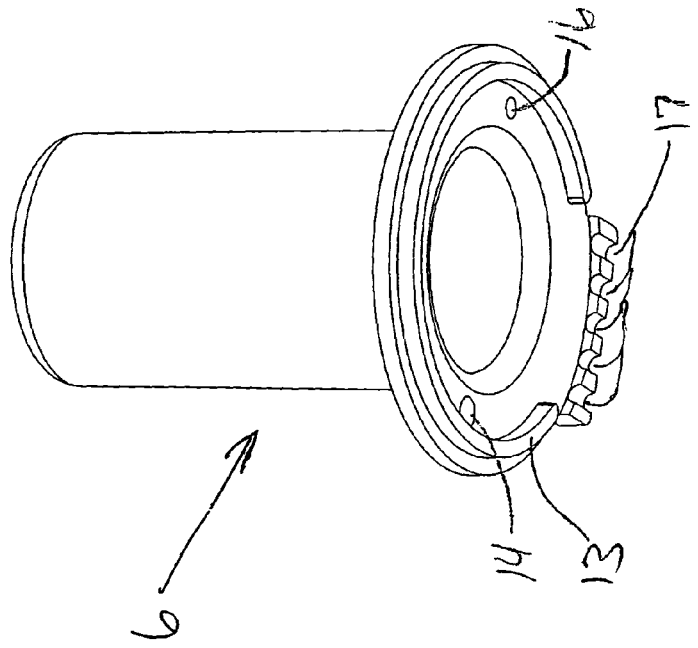
FIG. 2 is bottom perspective view of the cover shown in FIG. 1.

The disclosed LED warning lights are configured for mounting in the reflector shell for front corner, taillight and reverse lights of a motorized vehicle. Such warning lights may be referred to as Hide-A-Way warning lights. A first embodiment of the disclosed LED warning light is designated by the reference numeral 10 and includes a base 5 and mating cover 6 which together define an interior space enclosing a plurality of LED arrays 4. Each LED array 4 includes one or more LEDs mounted to a thermally conductive PC board. The PC board may be a metal core board or other PC board provided with thermally conductive features. The LED arrays are typically planar. The warning light includes a shaft 7 of thermally conductive material, such as aluminum or die cast metal.

In LED warning light 10, the shaft 7 is square in section and is secured to the base 5 by a screw 8. Alternatively, the shaft may be molded (cast) integrally with the base 5. The shaft 7 and base 5 are configured to support the LED arrays 4 and conduct heat away from the LEDs to an area outside the vehicle reflector shell. The base 5 is provided with fins to increase the radiant surface area and improve cooling. Other shaft configurations are possible, with typical sectional shapes in the form of a regular polygon such as a triangle, square, pentagon hexagon, etc. The sides of the disclosed shaft 5 are parallel and the sectional shape of the shaft 5 is constant along its length. Alternative configurations where the sides are not parallel and the sectional shape of the shaft varies along its length may be compatible with the disclosed LED warning lights.

The cover 6 is secured to the base by a screw 8 engaging an outer (distal) end of the shaft 7. The base 5 and cover 6 each include complementary cable openings (wire channels) 19, 17, respectively configured to surround electrical wires extending out of the warning light 10. The cover 6 and base 5 include mating lip structures 13 (cover), 15 (base) at the periphery of their connection not occupied by the cable openings 17, 19. As shown in FIG. 3, the upper inside portion of the cover 6 defines four pairs of ribs 26 arranged to compress the upper ends 27 of the LED arrays 4 against the upper end of the shaft when the cover is installed. The LED arrays 4 are also compressed against the shaft by fasteners 12. Maintaining face-to-face contact between the LED arrays 4 and the shaft 5 promotes efficient heat transfer.

The cover 6 also defines two openings 14, 16 communicating with the interior space defined by the cover 6 and base 5. These openings 14, 16 are used to fill the base 5 with encapsulant after the warning light has been assembled. Encapsulant (not shown) is injected into the larger of the two holes 14 while air escapes from the interior space through the smaller of the two holes 16. The base is filled with encapsulant to a level covering the horizontal PC board 9 and sealing the cable openings from the inside. Encapsulant is filled to the level of the holes 14, 16 at the bottom of the cover 6. The encapsulant seals the cable openings and seals the base 5 to the cover 6 as well as filling the openings 14, 16 in the cover 6 to provide a sealed enclosure.

Figure 5:
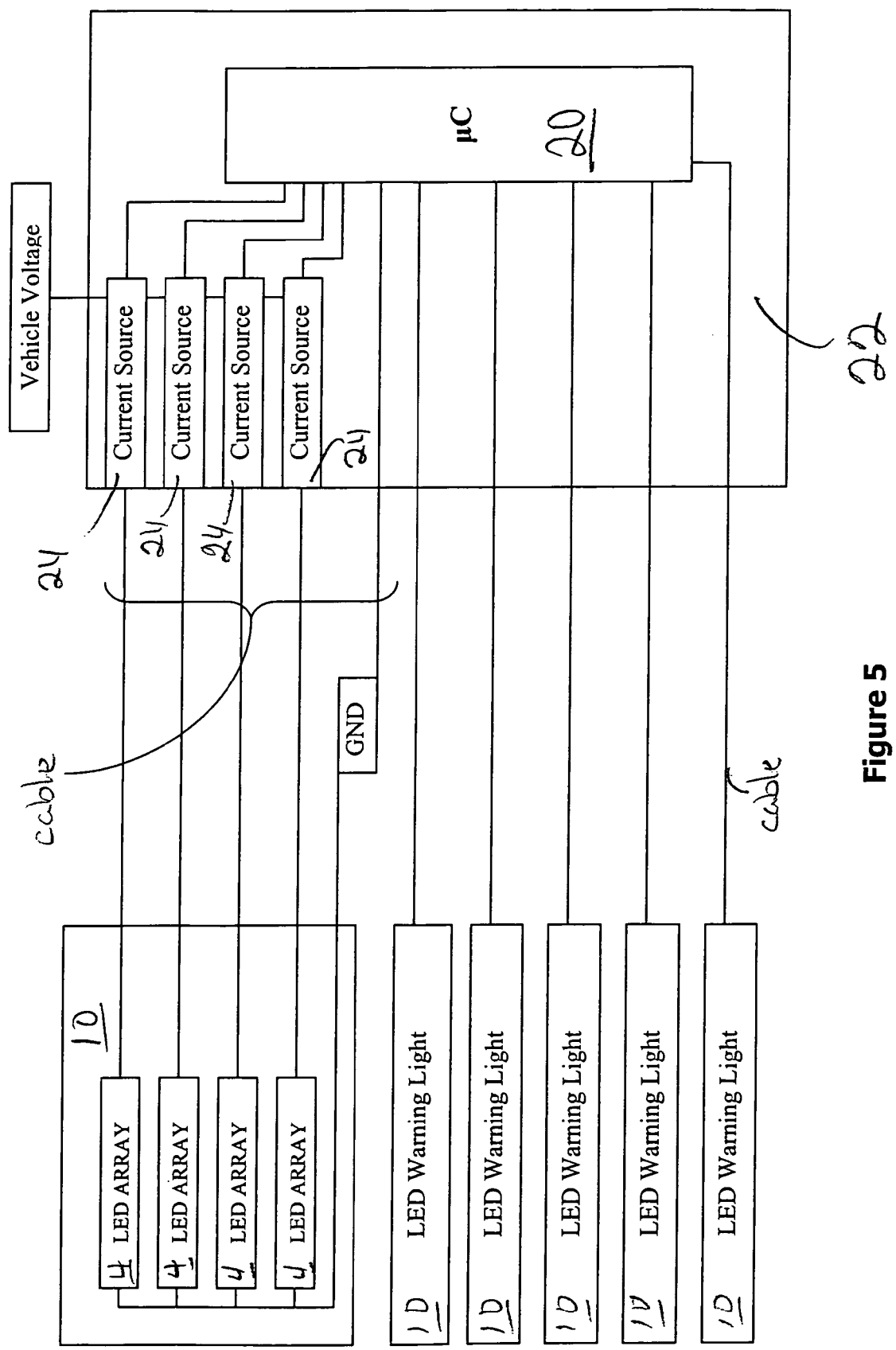
FIG. 5 is a block diagram of a representative warning signal light system including six of the disclosed LED warning lights.
Figure 6:
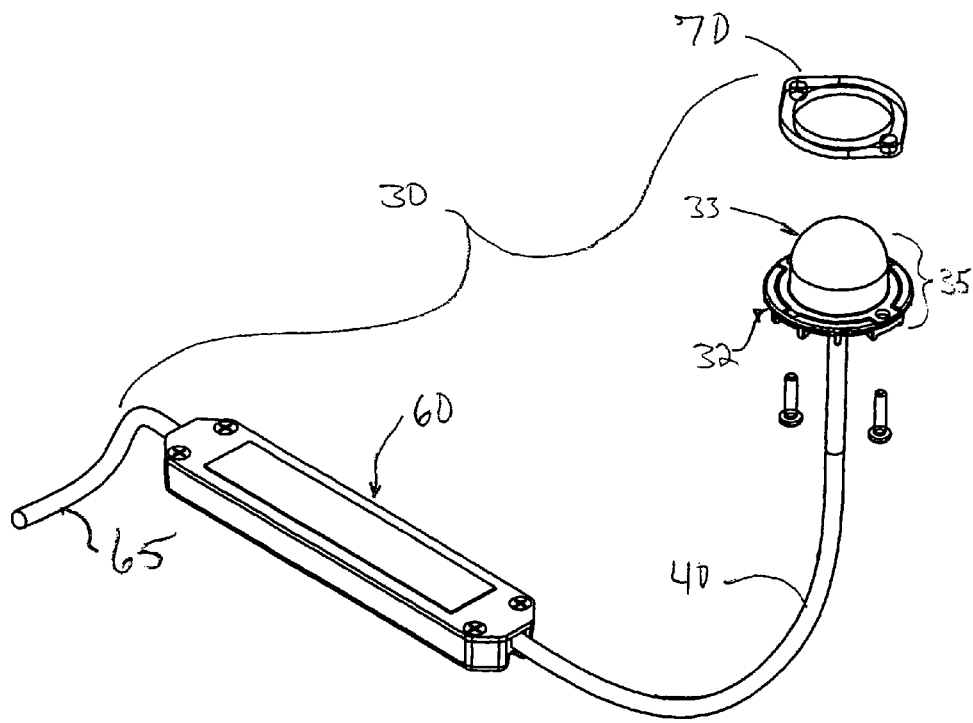
FIG. 6 is a perspective view of a second embodiment of an LED warning light according to aspects of the disclosure.
Figure 8:
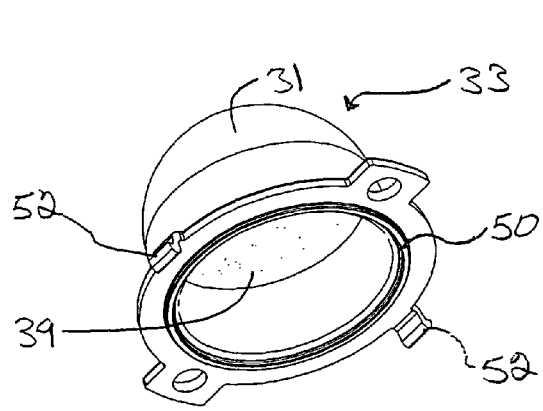
FIG. 8 is a bottom perspective view of a lens for the LED warning light of FIG. 6.

In LED warning light 10, each LED array 4 is provided with its own electrical power. With reference to FIG. 5, each of the four LED arrays has its own power wire and is connected to a common ground. The disclosed cable openings (wire channels) 17, 19 provide paths for five conductors, one power lead for each array and a common ground. In a typical installation, the five wires leaving an LED warning light will terminate in a plug which will mate with a corresponding plug or socket connected to a jacketed cable having five conductors connected to a power supply 22. This arrangement permits a controller 20 in the power supply 22 to activate each LED array individually and removes heat generating components such as current sources 24 from within the closed space defined by the cover 6 and base 5. In some configurations, two of the LED arrays 4 will have LEDs of a first color and the other two of the LED arrays 4 will have LEDs of a second color. For example, two of the arrays 4 may be red and two of the arrays may be blue. The arrays of the same color may be opposite or adjacent each other. A controller 20 may be configured to activate the LED arrays of the first color in an alternating pattern with the LED arrays of the second color to provide a dual color light signal. Alternatively, for certain signals one color may be used, while the other color may be employed for other signals.

In the disclosed system, the LED warning lights are driven by one or more remote power supplies 22 configured with current sources 24 for each LED array 4. Larger current sources could be employed to drive more than one array connected in parallel. Providing each LED array 4 with its own current source and power lead (wire) provides a safeguard against component failure. For example, if an LED or current source fails, only one LED array 4 will be extinguished in the disclosed configuration. The power supply 22 may be configured to sense such failure and provide some indication to those responsible for maintaining the emergency vehicle. The indication may take the form of a visual indicator on the power supply, such as a lit or extinguished LED. Alternatively, the power supply 22 controller 20 may be programmed to alter the warning light signal generated by the LED warning light experiencing the failure or may be programmed to extinguish the LED warning light in question to provide some positive indication of a problem.

The power supply will include a controller 20, typically in the form of a microprocessor programmed to apply power to the LED arrays 4 individually or more typically to all the arrays in a warning light simultaneously to produce light signals. The power supply may have two, four or six outlets. Typical installations will include LED warning lights in the front corners, taillights and/or backup light reflector shells (not shown). The power supply 22 controller 20 is programmed to coordinate the light signals generated by connected LED warning lights 10.

The LED arrays 4 are arranged around the shaft 7 to emit light in a 360° pattern inside the enclosure. In most, if not all, installed orientations of the LED warning light 10, some of the LED arrays 4 will be oriented to emit light directed at the reflecting surfaces of the enclosure, while other LED arrays 4 will be oriented to emit light directed through the lens of the enclosure. The disclosed LED warning lights 10 fill the reflector to provide a large illuminated surface area and also produce bright illumination directly through the lens of the enclosure. The resulting illumination pattern is very similar to prior art gaseous discharge tubes, with the advantages of LED durability, colored light emission and power efficiency.

Each of the disclosed LED arrays 4 include three LUXEON® Rebel LED lamps, each having a typical luminous flux of approximately 100 lm (lumens) at a drive current of approximately 350 mA. In this configuration, each LED warning light produces approximately 1200 lm, or approximately 80 lm per watt of applied power. The selected LEDs may be white LEDs or LEDs of a selected color. The cover may be tinted to filter light generated by white LEDs, for example to an amber/yellow color. Other LED lamps may be compatible with the disclosure.

Figure 1:
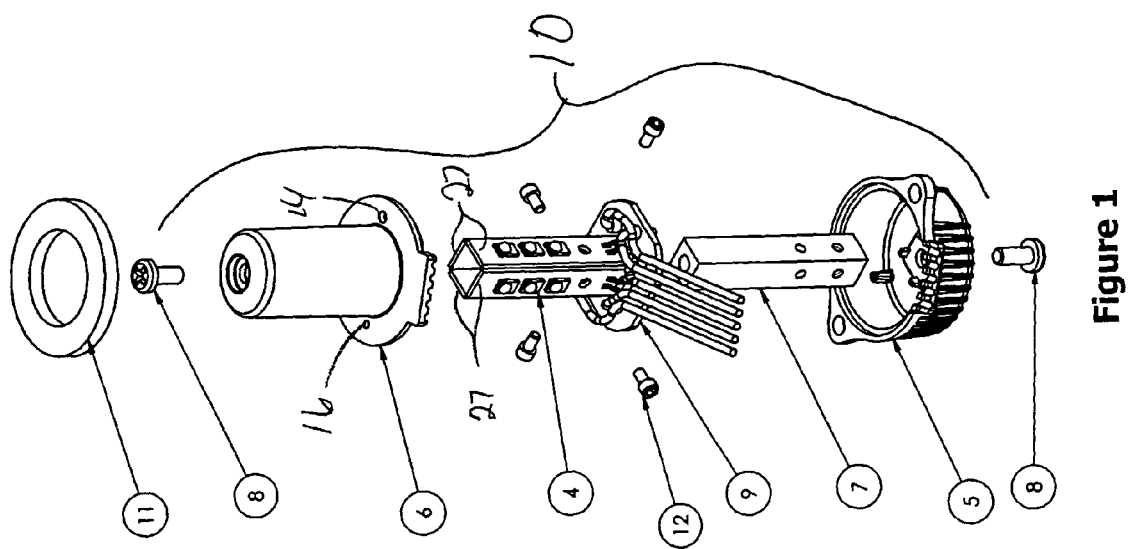
FIG. 1 is an exploded view of an embodiment of an LED warning light according to aspects of the disclosure.
Figure 1A:
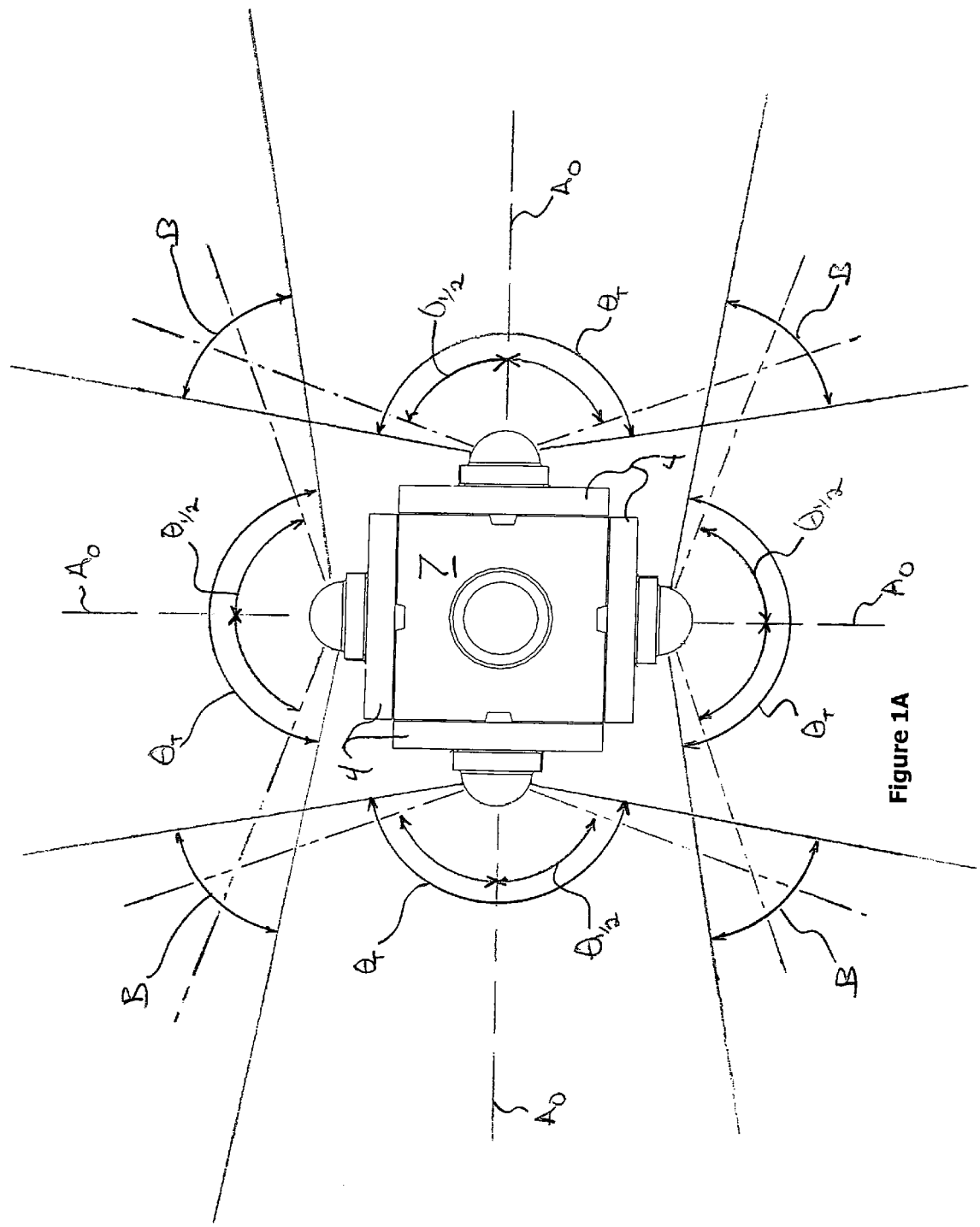
FIG. 1A is a top plan view of the post and LED arrays of the LED warning light of FIG. 1, showing the patterns of light emission.

The disclosed LUXEON® Rebel LEDs have a wide angle pattern of light emission with a total included angle $\theta_T$ of approximately 160° and a viewing angle $\theta_{1/2}$ of approximately 70°. The total included angle $\theta_T$ is the angle, centered on the optical axis of the LED lamp, within which 90% of the luminous flux produced by the lamp is emitted. The viewing angle $\theta_{1/2}$ is the angle with respect to the optical axis $A_O$ of the LED lamp at which the luminous intensity of the light pattern is ½ of the peak value. The peak luminous intensity of an LED lamp having a lambertian light pattern is typically at or near the optical axis $A_O$. As shown in FIG. 1A, the light emission pattern from each LED array 4 overlaps that of an adjacent LED array 4 at B to produce a pattern of light emission surrounding the shaft 7.

The cover 6, shaft 7 and LED arrays 4 of the disclosed LED warning light 10 are configured to minimize the size of the hole needed for installation. Each of the arrays is approximately 0.28"-0.3" wide, with each face of the shaft having a corresponding width. The disclosed LED warning light 10 requires a hole 0.75" in diameter. This configuration also minimizes any disruption of the light pattern generated by the vehicle signal lights used for running lights, turn signal lights and brake light signals. A gasket 11 is positioned between the flared base portion of the LED warning light 10 and the reflector enclosure when the LED warning light is installed to an enclosure to prevent intrusion of moisture and other contaminants. The flared base portion of the LED warning light remains outside the reflector enclosure, while the cover 6, shaft 7 and LED arrays 4 project into the space defined by the reflector shell.

An alternative embodiment of a LED warning light, designated by reference numeral 30, is illustrated in FIGS. 6 through 10. With specific reference to FIGS. 7 and 9, alternative LED warning light 30 employs a base 32 and dome-shaped cover 33 which mate to define an interior space. The LED warning light 30 also includes a power supply 60 integrated into the power cable 40.

Figure 7:
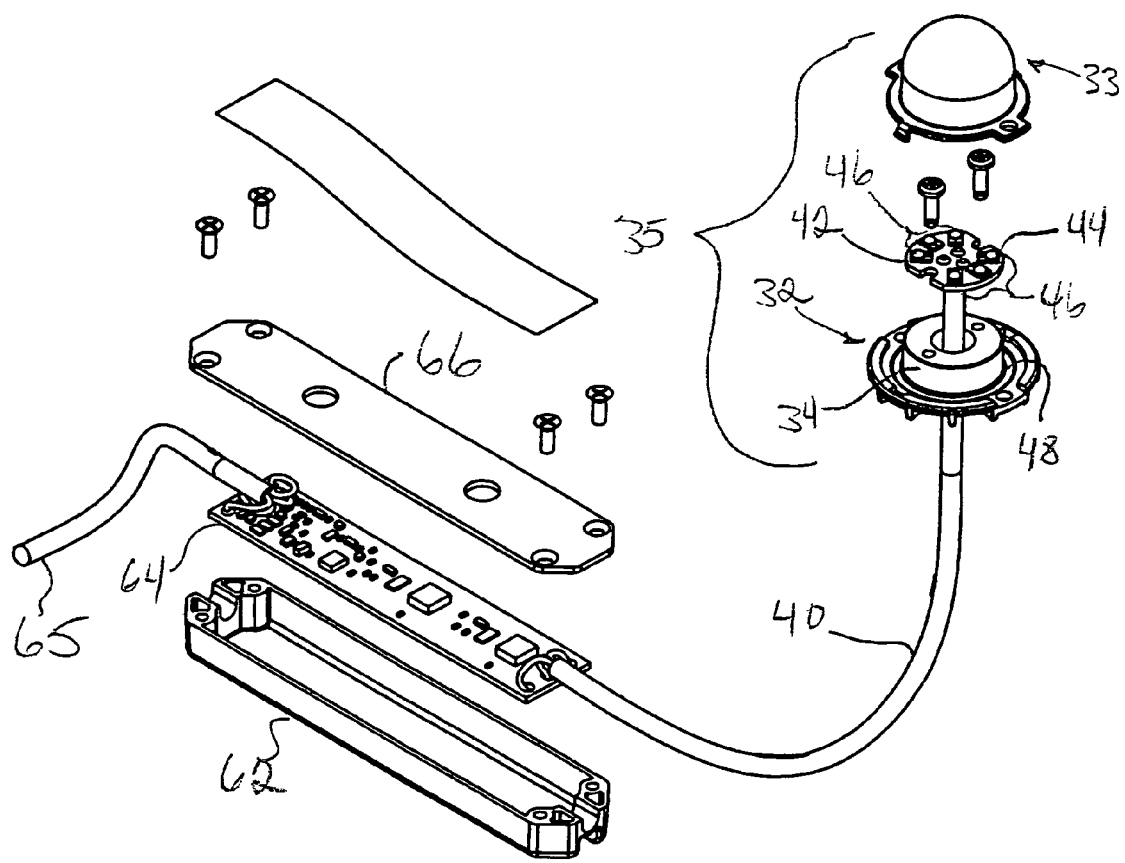
FIG. 7 is an exploded view of the LED warning light of FIG. 6.
Figure 10:
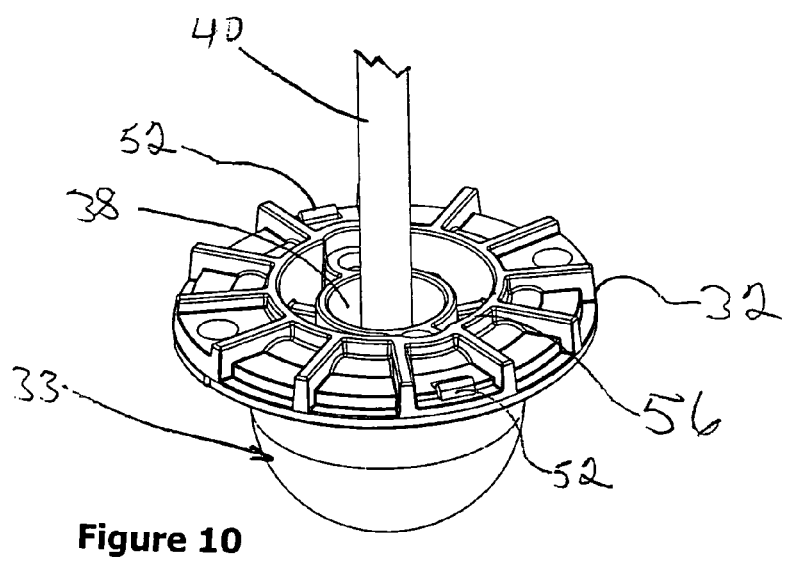
FIG. 10 is a bottom perspective view of the lens, base, and cable for the LED warning light of FIG. 6.

The base 32 is configured with a circular boss 34 extending upwardly from a flange 36 to a ring-shaped planar top surface 37. The circular boss 34 is configured with a central aperture 38 to admit a power cable 40. The base 32 is constructed of thermally conductive material such as die cast metal or thermally conductive plastic or thermally conductive composite material. A PC board 42 having a generally circular configuration is configured for mounting to the top surface 37 of the boss 34 by means of two screws, as shown in FIG. 7.

Six LED lamps 44 are mounted on the PC board 42 in two arcuate arrays 46 each array including three LED lamps 44. The three LED lamps 44 in each array 46 are electrically connected in series and receive power from the power cable 40 via traces on the PC board 42. The PC board 42 may be a standard fiber board material known as FR4 provided with a pattern of copper plated thermal vias (not shown) beneath each LED lamp 44 as is known in the art. Alternatively, the PC board 42 may be a metal-core PC board. The LED lamps 44 are positioned on the PC board 42 and provided with thermal vias to efficiently conduct heat away from the LED lamps 44 to the ring shaped boss 34 and the rest of the base 32. The LED lamps 44 are LUXEON Rebel LED lamps and may be selected from a variety of available colors or power ratings, depending upon the desired warning light signal and light emission pattern.

Figure 9:
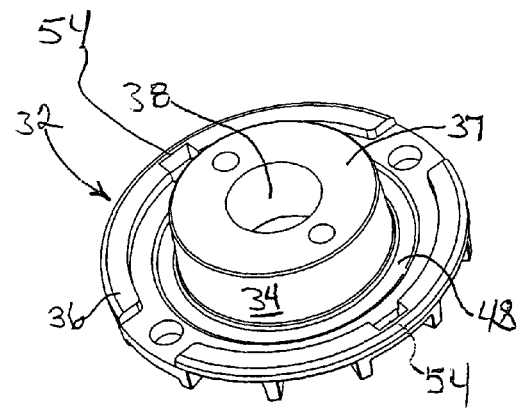
FIG. 9 is a top perspective view of a base for the LED warning light of FIG. 6.

As best seen in FIG. 9, the base 32 includes a flange 36 projecting radially from the bottom of the ring shaped boss 34. The upper surface of the flange 36 defines a circular groove 48 around the boss 34. The cover 33 has a dome shape, the upper portion 31 of which is substantially hemispherical as shown in FIGS. 6-8 and 10. The cover 33 is configured to surround the boss 34 and provide an enclosed space over the PC board 42 and LED lamps 44. The bottom of the cover 33 is configured to mate with complimentary features defined by flange 36 of the base 32. The bottom surface of the cover 33 also includes a circular projection 50 configured to mate with the groove 48 surrounding the boss 34. The cover also includes diametrically opposed latches 52 which mate with complimentary receptacles 54 defined by the base 32 to secure the cover 33 to the base 32.

During assembly, the PC board 42 with its attached power cable 40 is secured to the top surface 37 of the ring-shaped boss 34 using two screws. A thermally conductive gasket material (not shown) may be interposed between the bottom surface of the PC board 42 and the top surface 37 of the boss 34 as is known in this field. A ring of sealant material (not shown) is extruded into the groove 48 surrounding the boss 34. The cover 33 is then mated with the base 32. The circular projection 50 from the bottom of the cover penetrates the groove 48, contacting the sealant, while the latches 52 on the cover snap into the receptacles 54 defined by the base to retain the cover 33 in mated position while the sealant cures. The cover 33 and sealant prevent moisture penetration between the base 32 and cover 33 around the boss 34.

With reference to FIG. 9, the bottom side of the base 32 includes raised fins configured to increase the radiant surface area of the base 32 and enhance cooling. The central portion of the bottom side of the base 32 is bounded by a raised ring 56. After the PC board 42 and the attached power cable 40 are secured to the base 32, the base is positioned with the bottom side facing upward and the area bounded by the raised ring 56 is filled with encapsulant material (not shown). Encapsulant fills the opening 38 surrounding the power cable 40 and the holes which receive the PC board mounting screws. Once cured, the encapsulant prevents moisture penetration and provides strain relief for the power cable 40. The disclosed configurations and procedures provide a lighthead 35 that is sealed against the environment.

Figure 11:
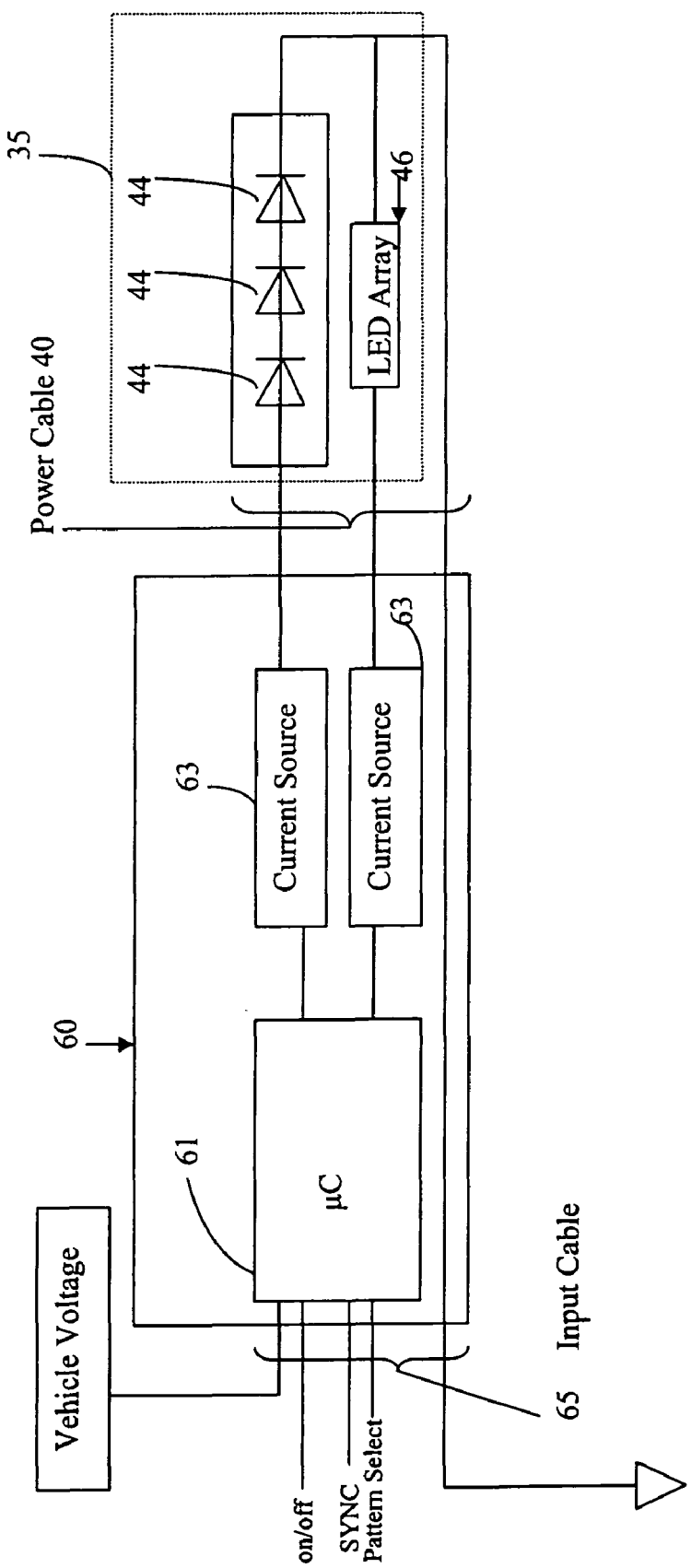
FIG. 11 is a schematic block diagram of the LED warning light and dedicated power supply of FIGS. 6-10.

With reference to FIG. 11, the power cable 40 extends from the lighthead 35 to a dedicated power supply 60. The power cable 40 includes a common ground and a power lead (wire) for each array of LED lamps 46. The power supply 60 structure includes a housing 62, PC board 64 and a cover 66. The PC board 64 includes a controller 61 and two current sources 63, one current source 63 for each array 46 of three series-connected LED lamps 44 in the light head 35. The controller 61 is preferably a microcontroller having on board memory and programmed to apply timed power pulses to the arrays 46 of LED lamps 44 to produce warning light signals. An input cable 65 delivers vehicle power, vehicle ground and several input signals to the power supply 60. The input signals include a synchronization signal SYNC, and a pattern select input. The SYNC signal is an input to the microcontroller 61 allowing the activity of multiple dedicated power supplies 60 to be coordinated to produce synchronized warning light signals. The microcontroller 61 is also responsive to a pattern selection input to select the pattern generated by the lighthead 35 from a plurality of patterns stored in memory as is known in the art. The selected pattern is stored in memory and is generated when vehicle power is applied to the dedicated power supply 60 via an on/off switch.

The electrical configuration of the dedicated power supply 60 is similar to that of the remote power supply 22 discussed above in that the plurality of LEDs in each lighthead are divided into series connected arrays 4, 46, each provided with its own current source 24, 63. The current sources 24, 63 are responsive to the microcontroller 20, 61 to deliver power to the LED arrays 4, 46.

The cover 33 may be clear or colored as desired. Light generated by the LED lamps 44 will pass through the upper, hemispherical-shaped portion 31 of the cover 33. The upper portion 31 of the cover 33 may be optically transparent or may include optical features to spread or distribute light according to the desired radiation pattern. One feature which has proven desirable is to provide a frosted surface texture to the inside surface 39 of the upper portion 31 of the cover 33. The relevant surface of the mold from which the cover 33 is produced is exposed to a dry grit blast treatment to provide a light surface texture on the corresponding inside surface of the upper portion 32 of the cover 33. One suitable texture is composed of randomly oriented features having a depth of approximately 0.00004" or about one micron (μm). Such randomly oriented textures may be produced by a variety of methods including EDM, dry grit (or glass bead) blasting or chemical treatments such as etching. The objective of the disclosed texture is to produce a plastic part which diffuses a small amount of the light emitted by the arrays of LEDs and illuminate the upper portion 31 of the cover 33 during warning light operation. Deeper or more aggressive textures, in excess of approximately 10 μm or about 0.0004" will typically produce undesirable scattering and internal reflection, which could reduce the overall luminous efficiency of the disclosed LED warning lights 10, 30.

In an exemplary embodiment, a mold for the cover 33 is machined from P20 tool steel, the surface of which is finished to an S.P.I. C-2 to C-3 finish to remove any tool marks. The mold is then heat treated to a hardness of 28-32 on the Rockwell Rc scale. The portion of the mold corresponding to the inside surface of the upper portion 31 of the cover 33 is then exposed to a dry grit blast treatment using #220-240 aluminum oxide grit to produce an S.P.I. D-2 finish. One corresponding industry standard is specified by Detroit Mold Engineering with the reference "D-M-E S.P.I. #D-2." An S.P.I. D-2 finish on the mold produces a part having a "frosted" or matte surface finish. The remaining portions of the mold are polished to an S.P.I. A-2 finish, which results in a smooth, shiny surface on the molded part.

Alternatively, the textured surface portions may be provided by electric discharge machining ("EDM") a corresponding section of the mold with an electric discharge machine. EDM is a process that involves applying a potential difference between an electrode and an electrically conductive workpiece to cause electric discharge therebetween. The impact of the discharge against the workpiece causes the workpiece to be machined. Different roughnesses may be achieved by varying certain operating parameters, such as the electrode material, the magnitude and time-dependence of the electric potential, as well as the electrode-workpiece distance. An EDM machine finish compatible with the textured portion of the cover for the disclosed LED warning lights is "CHARMILLES CH-28."

One measure of surface texture is Roughness Average $R_a$. Roughness average $R_a$, also known as arithmetic average (AA) and centerline average (CLA), is the arithmetic average of the absolute values of the measured profile height deviations taken within the sampling length and measured from the graphical centerline. This type of measurement can be taken by an instrument called a profilometer. The roughness average $R_a$ of a surface texture compatible with the disclosed LED warning lights is between approximately 10 and 40 micro inches or between approximately 0.25 and 1 μm (micron) and more preferably between 20 and 30 micro inches (0.5 μm and 0.75 μm).

Light from the LED lamps striking the textured surface of the cover is diffused, causing the upper (hemispherical) portion 31 of the cover 33 to be illuminated. Illuminating the upper (hemispherical) portion 31 of the cover 33 gives the illusion that light is emanating from the upper portion 31 and blends the light from the six LED lamps 44. When energized, this effect obscures the internal structures of the lighthead 35. Similar surface treatments may be employed on the cover 6 of the embodiment of the LED warning light designated in this application by reference numeral 10 and illustrated in FIGS. 1-5.

In a typical vehicle installation, a hole is prepared in the reflector shell of an original equipment vehicle light (not shown). The lighthead 10, 35 is secured to the reflector shell with self tapping screws (shown in FIG. 6) with the cover 16, 33 protruding into the vehicle light enclosure. A gasket 11, 70 is placed between the lighthead 10, 35 and the reflector shell to prevent moisture penetration into the reflector shell.

It will be appreciated that various of the above-disclosed and other features and functions or alternatives thereof, may be desirably combined into many other different systems, devices or applications. Various presently unforeseen or unanticipated alternatives, modifications, variations, or improvements therein may be subsequently made by those skilled in the art which are also intended to by encompassed by the following claims.

What is claimed is:

1. An LED warning light comprising:
  a base of thermally conductive material including at least one substantially planar surface;
  a plurality of LED lamps arranged in thermally conductive relationship to said planar surface, said LED lamps electrically connected to form a plurality of series arrays and each said LED lamp having an optical axis and generating a substantially symmetrical pattern of light emission surrounding said axis when electrical energy is applied to said lamp;
  a light transmissive cover configured to mate with said base to define an enclosed space surrounding said plurality of LED lamps, said cover having inside and outside surfaces,
  wherein at least one of said inside or said outside surfaces includes a surface texture and light from said LEDs incident upon said surface texture is diffused, and each said series array having a power source independent of the other said series arrays.

2. The LED warning light of claim 1, wherein said surface texture has a roughness average of between 10 and 40 micro inches.

3. The LED warning light of claim 1, wherein said surface texture has a roughness average of between 20 and 30 micro inches.

4. The LED warning light of claim 1, wherein said cover and base are joined to form a sealed enclosure surrounding said plurality of LEDs.

5. The LED warning light of claim 1, comprising a power supply including a controller constructed and arranged to apply timed pulses of electrical power to each said power source to generate warning light signals.

6. The LED warning light of claim 1, wherein said surface texture is composed of features having a depth of approximately 0.00004".

7. An LED warning light comprising:
  a base of thermally conductive material including at least one substantially planar surface;
  a plurality of LED lamps arranged in thermally conductive relationship to said planar surface, said LED lamps electrically connected to form at least one array and each said LED lamp having an optical axis and generating a substantially symmetrical pattern of light emission surrounding said axis when electrical energy is applied to said lamp;
  a light transmissive cover configured to mate with said base to define an enclosed space surrounding said plurality of LED lamps, said cover having inside and outside surfaces,
  wherein at least one of said inside or said outside surfaces includes a surface texture and light from said LEDs incident upon said surface texture is diffused, and said base includes a shaft and said substantially planar surface comprises a plurality of substantially planar surfaces formed on the outside of said shaft.

* * * * *